United States Patent
Chaysinh et al.

(10) Patent No.: US 11,330,511 B2
(45) Date of Patent: May 10, 2022

(54) METHOD AND SYSTEM FOR MULTI-ACCESS EDGE COMPUTING (MEC) SELECTION AND LOAD BALANCING

(71) Applicant: Verizon Patent and Licensing Inc., Basking Ridge, NJ (US)

(72) Inventors: Stephane Chaysinh, Basking Ridge, NJ (US); John A. Turato, Garden City South, NY (US); Brian Peebles, Cranford, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 11 days.

(21) Appl. No.: 16/907,787

(22) Filed: Jun. 22, 2020

(65) Prior Publication Data

US 2021/0400568 A1   Dec. 23, 2021

(51) Int. Cl.
| | |
|---|---|
| *H04W 48/16* | (2009.01) |
| *H04W 88/06* | (2009.01) |
| *H04L 65/10* | (2022.01) |
| *H04L 65/1016* | (2022.01) |
| *H04W 36/14* | (2009.01) |

(52) U.S. Cl.
CPC ......... *H04W 48/16* (2013.01); *H04L 65/1006* (2013.01); *H04L 65/1016* (2013.01); *H04W 36/14* (2013.01); *H04W 88/06* (2013.01)

(58) Field of Classification Search
CPC ..... H04W 48/16; H04W 36/14; H04W 88/06; H04L 65/1006; H04L 65/1016
See application file for complete search history.

(56) References Cited

U.S. PATENT DOCUMENTS

| | | | | |
|---|---|---|---|---|
| 2020/0169856 | A1* | 5/2020 | Yang | H04L 43/16 |
| 2021/0028992 | A1* | 1/2021 | Chang | H04L 67/10 |
| 2021/0144517 | A1* | 5/2021 | Guim Bernat | G06F 11/3006 |
| 2021/0153041 | A1* | 5/2021 | Parvataneni | H04W 24/02 |

\* cited by examiner

*Primary Examiner* — Kristie D Shingles (57) ABSTRACT

A device, method, and system provide for collecting service parameters associated with application sessions associated with a plurality of MEC clusters; obtaining capability information associated with each of the plurality of MEC clusters; generating service profiles for a set of transport networks based on the service parameters and the capability information, wherein each transport network includes at least one of the plurality of MEC clusters; receiving, from a user equipment (UE) device, a request for a MEC service having a minimum service requirement; and selecting, based on the service profiles, a MEC cluster from the plurality of MEC clusters to provide the MEC service, wherein the selected MEC cluster is included in a first transport network that meets the minimum service requirement.

20 Claims, 7 Drawing Sheets

METHOD AND SYSTEM FOR MULTI-ACCESS EDGE COMPUTING (MEC) SELECTION AND LOAD BALANCING

BACKGROUND INFORMATION

Multi-access Edge Computing (MEC) (also known as mobile edge computing) is being developed in which some network capabilities—conventionally implemented in a core network or a cloud network (e.g., computation, storage, transport, etc.)—are alternatively situated at the network "edge" relative to a point of attachment of a wireless communication device to a wireless access network. Application services available to the attached wireless communication device may be configured with a subscription to MEC services to reduce end-to-end latency in a data transport network and to enable offloading of high computation loads from the core network. Typically, MEC resources are designated for an application session based primarily on geographic proximity to the requesting communication device.

DETAILED DESCRIPTION OF PREFERRED EMBODIMENTS

The following detailed description refers to the accompanying drawings. The same reference numbers in different drawings identify the same or similar elements.

A wireless communication device, referred to herein as a user equipment (UE) device, may connect wirelessly to a network via a wireless access station ("wireless station"). The wireless station includes a radio frequency (RF) transceiver and, together with other wireless stations, may form part of a radio access network (RAN). The RAN may interface with a core network that enables establishment of an Internet Protocol (IP) connection to other networks, such as the public Internet or a private IP network. When a UE device requests an application service available from a server device located in an IP network, the UE device may need to establish an IP connection to the IP network via the core network. Since the server device may be distant to the UE device from a geographic and/or a network topological perspective, such a connection may traverse a considerable number of network nodes (e.g., routing devices and/or gateway devices), each of which individually contributes an associated processing time to end-to-end latency. Thus, the connection between the UE device and the server device—i.e., the data transport network—may experience considerable latency for an application session. Generally, lower latencies are achieved from shorter transport networks, for example, by siting requested service resources at shorter physical distances to the UE device, by deploying software and/or hardware configurations having relatively superior latency performance, and by dynamically managing network loading. Other non-network-related criteria that may impact end-to-end latency include UE device mobility, UE device capability, radio propagation.

To manage latency and/or other data transport network parameters, and to offload traffic from core networks and gateway devices, a communication services provider that manages a RAN may deploy a MEC network that includes MEC clusters that provide applications with compute, storage, and transport resources near a network edge. MEC clusters are particularly well-suited for applications having low-latency and localized compute/storage requirements and that are executable on UE devices within a RAN's service coverage area. Practically, the MEC network may be reached with fewer network node traversals ("hops") than traffic routed to devices in non-MEC networks.

When an application service (or an aspect thereof) is requested from a MEC network, the requesting UE device may be connected to a MEC cluster in the MEC network as an alternative to being connected to an application server in the core network or an external packet data network. Different MEC networks may service different sets of wireless stations. A set of MEC networks distributed in different locations may be referred to as a "distributed edge" or "distributed edge computing." Thus, service providers may establish MEC clusters in different geographic regions to minimize latency for services available at service locations (e.g., local radio environments (LREs)) throughout those regions and ensure certain service levels.

A customer (e.g., an application provider) may register with a service provider to make an application available for MEC services. For each application, the customer may designate an application policy that defines service parameters, such as achieving certain key performance indicators (KPIs) and/or service level agreements (SLAs) for the services. To ensure that an application achieves the required SLA for users in substantially any service location (e.g., LRE) in a coverage area (e.g., cell), application services (e.g., computation, storage, transport, etc., for the particular application) may be deployed in regional MEC clusters.

In some cases, not every MEC cluster in a local MEC network available to service a UE device will provide the same level of servicing to the UE device, for example, with respect to latency. As an example, the request may be one that one or more MEC cluster may not be able to handle, for example, due to an excessive computation and/or storage load. For another example, the request may require an aspect of an application, or a hardware component (e.g., an artificial intelligence (AI) accelerator), that is not available at one or more MEC cluster. As a further example, the requested service may have a latency requirement that one or more MEC cluster cannot meet, because of network loads or processing delays. For these, and other reasons, a provider of communication services may benefit from a comparison of data transport network parameters for each MEC cluster in MEC networks servicing UE devices having subscriptions managed by the provider.

Currently, an application provider has limited capability, in analyzing various criteria (other than route distance to MEC) which impact data transport network parameters, to determine which of the MEC clusters are able to satisfy the SLA requirements for each application service available to particular end devices at particular LREs. Thus, MEC orchestration, as described herein, utilizes cellular network intelligence to calculate dynamic transport network parameters that enable the provider to determine a MEC cluster to be selected for an application session for a particular end device in a particular LRE.

Implementations described herein relate to analyzing transport network parameter data in distributed edge computing. An orchestration system may identify transport network parameters for MEC clusters. Each MEC cluster may collect the identified transport network parameters for the orchestration system which calculates and predicts parameters such as latency for the transport network associated with each MEC cluster. The orchestration system then selects a MEC cluster based on the calculated and predicted parameters as well as SLA requirements associated with different application services.

The identified parameters may specify a service parameter for a communication from a particular LRE. As an example, the calculation/prediction may be based on a measure of a latency value, such as one-way delay (OWD), round-trip time (RTT), bandwidth-delay product, packet delay variation, and/or another type of latency value. As another example, the calculation/prediction may be based on a measure a different type of parameter, such as, for example, bandwidth, data throughput, jitter, error rate, and/or signal quality.

Furthermore, the orchestration system may obtain capability information associated with the different MEC clusters. The capability information may include, for example, information indicating whether a particular one of the MEC clusters includes at least one of a particular type of graphics processing unit (GPU), a particular type of hardware accelerator device, a particular type of virtual device, a particular type of operating system, a particular type of application, and/or other types of capability information. Additionally or alternatively, the capability information may include information relating to the capacity of particular hardware elements or devices, such as processor, memory, and/or storage devices, virtual devices, applications, and/or other functionality of a MEC cluster, information relating to network capacity or bandwidth of a network link associated with the MEC cluster, and/or other type of capacity information. In one implementation, capacity information for each MEC cluster may be compared to a current load for each MEC cluster, for example, to determine the effect of MEC process queuing on latency performance.

The orchestration system may use the collected parameter data and capability information from the MEC clusters and may perform comparisons to generate latency profiles corresponding to the relative latencies of the candidate MEC clusters. For example, the latency profiles may relate, for a particular MEC device, particular LREs and communication protocols to latency values and/or other parameters, such as bandwidth, throughput, an error rate, and/or a signal quality. The generated latency profiles may then be used to select a MEC cluster from a set of MEC clusters for a UE device requesting a MEC service. For example, the orchestration system may select a MEC cluster that may not be the nearest MEC cluster to the UE device, but nevertheless best satisfies a latency or other service requirement for the requested MEC service.

Systems and methods described herein direct a UE device to a MEC service instance selected from candidate MEC instances that provide an application session at different service levels for a geographic area. An orchestration system receives application parameters, for a designated coverage area and device group, for a requested application to be serviced using MEC resources. The orchestration system implements artificial intelligence to calculate an end-to-end latency for different routes in a data transport network via which the application service is available to a device located in an LRE. The orchestration system makes an initial MEC resource selection and deploys, when the MEC resources are available to support the application parameters, an instance of the application at a MEC cluster. The orchestration system determines whether the deployed instance of the application will meet the application parameters for service during a mobility of the end user device. The orchestration system predicts the impact of mobility on the initial transport network's latency and performs a MEC handover, if necessary, and updates a MEC-domain name service (DNS) for the deployed instance of the application at a MEC cluster accordingly. Furthermore, the orchestration system may perform load balancing among MEC clusters based on predicted transport network parameters and a set of other factors.

Figure 1:
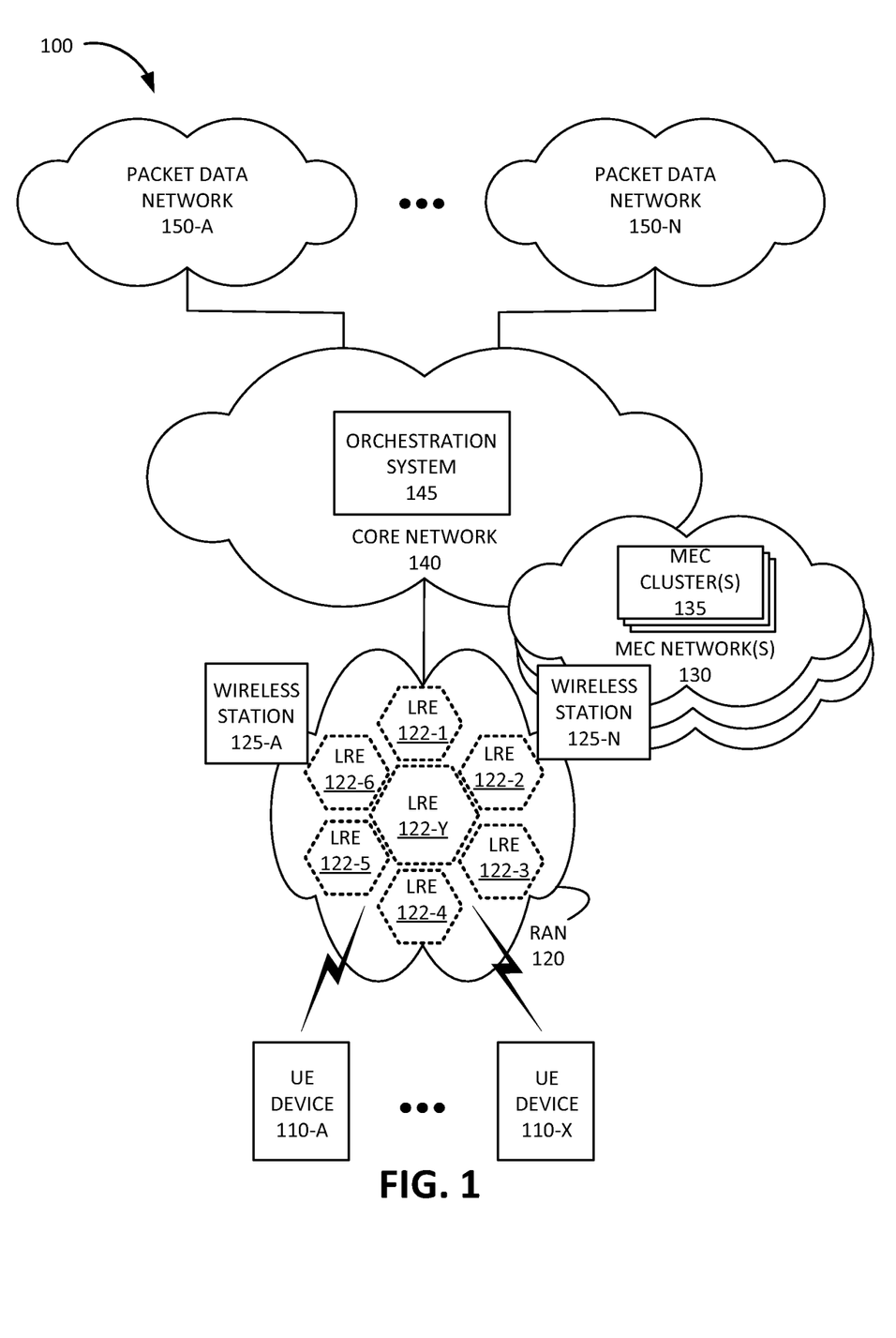
FIG. 1 illustrates an environment according to an implementation described herein.

FIG. 1 is a diagram of an exemplary environment 100 in which the systems and/or methods, described herein, may be implemented. As shown in FIG. 1, environment 100 may include UE devices 110-A to 110-X (referred to herein individually as "UE device 110" and collectively as "UE devices 110"), a radio access network (RAN) 120, MEC networks 130, a core network 140, and packet data networks 150-A to 150-N (referred to herein collectively as "packet data networks 150" and individually as "packet data network 150").

UE device 110 includes a device that has computational and wireless communication capabilities. UE device 110 may be implemented as a mobile device, a portable device, a stationary device, a device operated by a user, or a device not operated by a user. For example, UE device 110 may be implemented as a Mobile Broadband device, a smartphone, a computer, a tablet, a netbook, a wearable device, a vehicle support system, a gaming system, a drone, an Internet of things (IoT) device, or some other type of wireless device. According to various exemplary embodiments, UE device 110 may be configured to execute various types of software (e.g., applications, programs, etc.), such as an application client for an application that receives service from MEC network 130 and/or packet data network 150. UE device 110 may support one or multiple radio access technologies (RATs, e.g., 5G, 4G, etc.), one or multiple frequency bands, network slicing, dual-connectivity, and such. Additionally, UE device 110 may include one or multiple communication interfaces that provide one or multiple (e.g., simultaneous or non-simultaneous) connections via the same or different RATs, frequency bands, etc.

RAN 120 may enable UE devices 110 to connect to core network 140 for mobile telephone service, Short Message Service (SMS) message service, Multimedia Message Service (MMS) message service, Internet access, cloud computing, and/or other types of data services. RAN 120 may include wireless stations 125-A to 125-N (referred to herein collectively as "wireless stations 125" and individually as "wireless station 125"). Each wireless station 125 may include devices and/or components configured to enable wireless service in LREs 122-1 to 122-Y (referred to herein collectively as "LREs 122" and individually as "LRE 122"). For example, for each LRE 122, wireless station 125 may include a radio frequency (RF) transceiver facing a particular direction. LRE 122 may correspond to a tracking area (TA) or a local area data network (LADN) service area. Wireless station 125 may include a Fourth Generation (4G) wireless station configured to communicate with UE devices 110 as an eNodeB that uses a 4G Long Term Evolution (LTE) air interface. Additionally, or alternatively, wireless station 125 may include a Fifth Generation (5G) wireless station configured to communicate with UE devices 110 as a gNodeB (gNB) that uses a 5G New Radio (NR) air interface generated by antenna arrays configured to send and receive wireless signals in the mm-wave frequency range.

Furthermore, RAN 120 may include features associated with an LTE Advanced (LTE-A) network and/or a 5G core network or other advanced network, such as management of 5G NR wireless stations; carrier aggregation; advanced or massive multiple-input and multiple-output (MIMO) configurations; cooperative MIMO (CO-MIMO); relay stations; Heterogeneous Networks (HetNets) of overlapping small cells and macrocells; Self-Organizing Network (SON) functionality; MTC functionality, such as enhanced MTC (eMTC) channels (also referred to as Cat-M1), Low Power Wide Area (LPWA) technology such as Narrow Band (NB) IoT (NB-IoT) technology and/or other types of MTC; and/or other types of LTE-A and/or 5G functionality.

Each MEC network 130 may be associated with one or more wireless stations 125 and provide MEC services for UE devices 110 attached to wireless station 125. MEC network 130 may be in proximity to a set of wireless stations 125 from a geographic and network topology perspective. As an example, MEC network 130 may be co-located with wireless stations 125. As another example, MEC network 130 may be closer to some of wireless stations 125, and reachable via fewer network hops and/or fewer switches, than other wireless stations 125 and/or packet data networks 150. As a further example, MEC network 130 may be reached without having to go through a gateway device, such as a 4G Packet Data Network Gateway (PGW) or a 5G User Plane Function (UPF).

MEC network 130 may interface with RAN 120 and/or with core network 140 via a MEC gateway device (not shown in FIG. 1). In some implementations, MEC network 130 may be connected to RAN 120 via a direct connection to wireless station 125. In other implementations, MEC network 130 may include, or be included in, core network 140. MEC network 130 may support UE device 110 mobility and handover application sessions from a first MEC network 130 to a second MEC network 130 when UE device 110 experiences a handover from a one wireless station 125 to another wireless station 125.

MEC network 130 may include MEC clusters 135, and MEC network 130 may support device registration, discovery, and/or management of MEC clusters 135. MEC cluster 135 includes particular hardware capabilities, such as particular central processing units (CPUs), GPUs, hardware accelerators, and/or other types of hardware capabilities. Furthermore, MEC cluster 135 includes particular software capabilities, such as a particular operating system, virtual machine, virtual container, application, and/or another type of software capability.

MEC cluster 135 may connect to wireless stations 125 in RAN 120 and provide MEC services to UE devices 110 via wireless station 125. For example, a MEC service may be associated with a particular application, such as a content delivery system that provides streaming video on demand, an audio streaming service, a real-time online game, a virtual reality application, a medical or health monitoring application, and/or another type of application with a low latency requirement. As another example, a MEC service may include a cloud computing service, such as cache storage, use of AI accelerators for machine learning computations, use of GPUs for processing of graphic information and/or other types of parallel processing, and/or other types of cloud computing services. As yet another example, a MEC service may include a network service, such as authentication, for example via a certificate authority for a Public Key Infrastructure (PKI) system, a local DNS service, implementation of a virtual network function (VNF), and/or another type of network service. As yet another example, a MEC service may include control of IoT devices, such as hosting an application server for autonomous vehicles, a security system, a manufacturing and/or robotics system, and/or another type of IoT system.

MEC cluster 135 may control devices enabled to collect parameters associated with MEC cluster 135, such as latency, throughput, signal quality, and/or other types of parameters from various locations in the service area of wireless station 125 associated with MEC cluster 135. A collection device may include UE device 110 that sends parameter data to MEC cluster 135 via wireless station 125. Additionally, or alternatively, the collection device may include a device included in wireless station 125, MEC network 130, or in core network 140 that communicates with MEC cluster 135 using a wired connection and/or a short-range wireless connection (e.g., WiFi, Bluetooth, etc.). MEC cluster 135 may obtain parameter data sent by the collection device, determine parameter values associated with the parameter data, and provide the determined parameter values to orchestration system 145 in core network 140.

Core network 140 may include one or multiple networks of one or multiple network types and technologies to support RAN 120. For example, core network 140 may be implemented to include a next generation core (NGC) network for a 5G network, an Evolved Packet Core (EPC) of an LTE network, an LTE-A network, an LTE-A Pro network, and/or a legacy core network. Depending on the implementation, core network 140 may include various network devices to provide, for example, a user plane function (UPF), an access and mobility management function (AMF), a session management function (SMF), a unified data management (UDM) device, an authentication server function (AUSF), a network slice selection function (NSSF), a network repository function (NRF), a policy control function (PCF), and so forth. According to other exemplary implementations, core network 140 may include additional, different, and/or fewer network devices than those described.

Core network 140 may include orchestration system 145. Orchestration system 145 may include computer devices, such as server devices, configured to collect performance information associated with MEC networks 130. Orchestration system 145 may identify transport network parameters to MEC clusters 135, and collect the parameter data and generate a set of latency profiles based on the collected data. The latency profiles may be used to select a MEC cluster for a particular application session for UE device 110. Additionally, orchestration system 145 may handoff UE device 110 to another MEC cluster 135 when a threshold for a parameter for the initial MEC cluster 135 is reached or exceeded.

Packet data networks 150-A to 150-N may be associated with an access point name (APN) and UE device 110 may request a connection to packet data network 150 using the APN. Packet data network 150 may include, and/or be connected to and enable communication with, a local area network (LAN), a wide area network (WAN), a metropolitan area network, an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks. Packet data network 150 may include different cloud platforms that use different protocols and commands, which may include Amazon® Web Services (AWS), Microsoft Azure®, IBM IOT Bluemix®, etc. According to an implementation, the cloud platform may host different application services used by UE devices 110. Application services may, for example, work in conjunction with MEC instances to provide application services to UE devices 110. According to one implementation, application services may identify when UE devices 110 enters an LRE having available MEC services.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
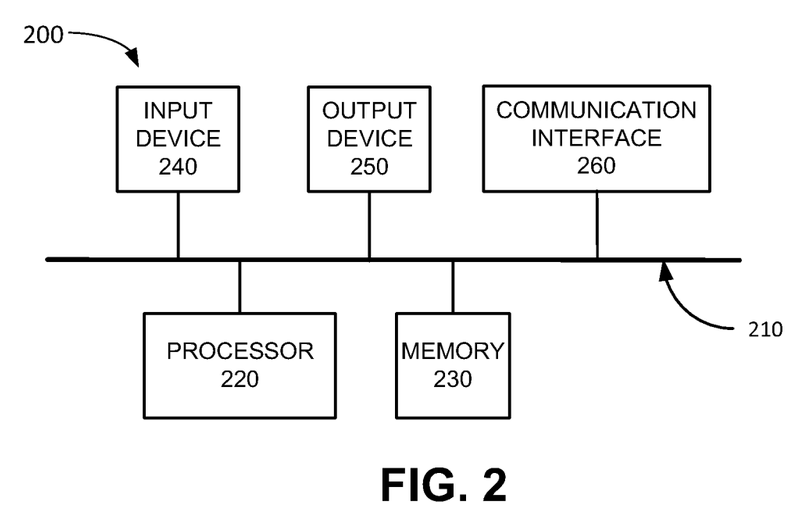
FIG. 2 illustrates exemplary components of a device that may be included in the environment of FIG. 1 according to an implementation described herein.

FIG. 2 is a diagram illustrating example components of a device 200 according to an implementation described herein. UE device 110, wireless station 125, MEC cluster 135, and/or orchestration system 145 may each include, or be implemented on, one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, CPU, GPU, tensor processing unit (TPU), hardware accelerator, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that stores information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the customer. In some embodiments, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to RF signals and/or a receiver that converts RF signals to baseband signals. Communication interface 260 may be coupled to an antenna for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As described in detail below, device 200 may perform certain operations relating to performance monitoring of MEC clusters 135. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally, or alternatively, one or more components of device 200 may perform one or more tasks described as being performed by one or more other components of device 200.

Figure 3:
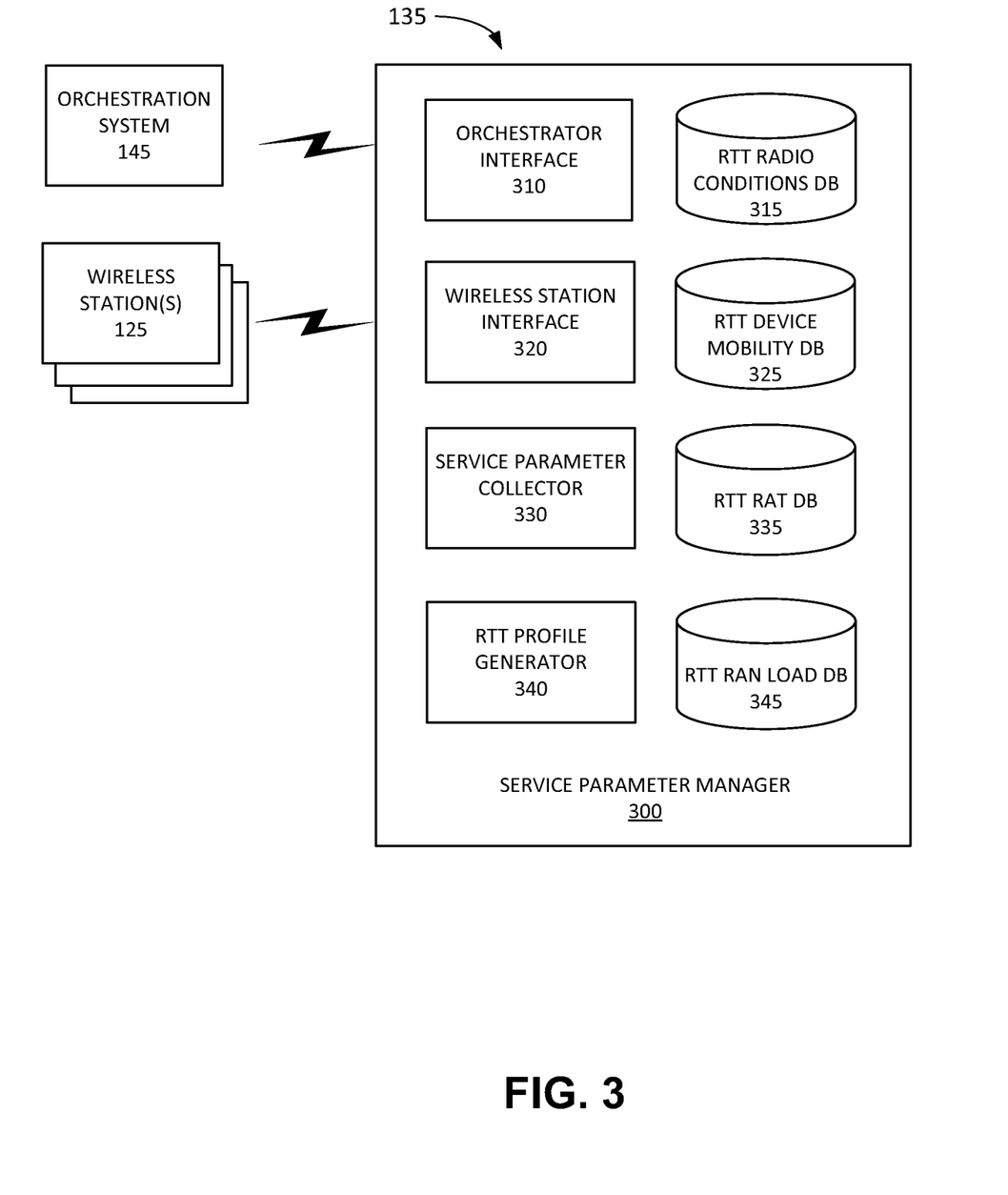
FIG. 3 illustrates exemplary components of the MEC cluster of FIG. 1 according to an implementation described herein.

FIG. 3 is a diagram illustrating exemplary components of a service parameter manager 300 of MEC cluster 135. The components of MEC cluster 135 may be implemented, for example, via processor 220 executing instructions from memory 230. Alternatively, some or all of the components of MEC cluster 135 may be implemented via hard-wired circuitry. As shown in FIG. 3, MEC cluster 135 may include an orchestrator interface 310, an RTT radio conditions database (DB) 315, a wireless station interface 320, an RTT device mobility database (DB) 325, a service parameter collector 330, an RTT RAT DB 335, an RTT profile generator 340, and an RTT RAN load DB 345. Furthermore, MEC cluster 135 may be in communication with one or more UE devices 110 via, for example, RAN 120.

Orchestrator interface 310 may be configured to communicate with orchestration system 145. For example, orchestrator interface 310 may be configured to receive instructions from orchestration system 145 identifying a set of service parameter values to be collected during an application session in which an application service instance on MEC cluster 135 executes on UE device 110 in LRE 122. In one implementation, the parameter values may include various RTTs for data packets sent/received in the application session. Wireless station interface 320 may be configured to communicate with UE device 110 in the application session via wireless station 125. Service parameter collector 330 may, based on instructions forwarded by orchestrator interface 310, be configured to collect data for the set of service parameter values. RTT profile generator 340 may be configured to use the collected data to generate a set of RTT profiles based on the application session.

RTT radio conditions DB 315 may store information relating to local radio conditions for UE 110 associated with the application session at the LRE location. In one example, the radio conditions may include signal strength, such as received signal code power (RSCP), as well as signal interference, such as reference signal receive power (RSRP), and/or other signal parameters such as received signal strength indicator (RSSI), reference signal received quality (RSRQ), etc. In one implementation, RTT radio conditions DB 315 may store RTT profiles for data packets under the observed local radio conditions. In one implementation, the RTTs may be grouped into qualitative categories of RTTs including "excellent" (e.g., RSCP>−80 dbm and RSRQ>− 10 db), "good" (e.g., −90 dbm<RSCP<−80 dbm and −10 db<RSRQ<−15 db), "mid-cell" (e.g., −100 dbm<RSCP>− 90 dbm and −15 db<RSRQ<−20 db), and "cell edge" (e.g., RSCP<−100 dbm and RSRQ<−20 db). Other categories and/or ranges are possible.

RTT device mobility DB 325 may store information of mobility characteristics for UE 110 associated with the application session at the LRE location. In one example, the device mobility may identify a relative speed associated with the change in location of UE 110 during the application session. In one implementation, RTT device mobility DB 315 may store RTT profiles for data packets under the identified speed of UE 100. In one implementation, the RTTs may be grouped into qualitative categories of RTTs including "stationary" (e.g., no detected movement), "footspeed" (e.g., ≤4 mph), "vehicular—city" (e.g., >4 mph≤45 mph), and "vehicular—highway" (e.g., >45 mph). Other categories and/or ranges are possible.

RTT RAT DB 335 may store information relating to radio access technology used by UE 110 associated with the application session at the LRE location. In one example, RTT RAT DB 335 may store RTT profiles for radio access technology including 5G, 4G, WiFi, etc. Other technologies are possible. RTT RAN load DB 345 may store information relating to network load conditions associated with the application session at the LRE location. In one example, RTT RAN load DB 345 may store RTT profiles for load conditions including radio bandwidth, number of users, allocated block resources, packet size, etc. Other parameters are possible.

For any of the RTT profiles described, the RTT profiles for a particular LRE may further be subdivided into indoor RTTs, outdoor RTTs, and/or altitude-specific RTTs, etc. In one implementation, RTT profile generator 340 may generate an RTT profile for individual LREs according to: $RTT = Wrad*RTT_{rad} + Wm*RTT_{mob} + Wrat*RTT_{rat} + Wg*RTT_{load}$, wherein Wrad is a weighting value for radio conditions, Wm is a weighting value for device mobility, Wrat is a weighting value for radio access technology, and Wg is a weighting value for RAN load.

Although FIG. 3 shows exemplary components of MEC cluster 135, in other implementations, MEC cluster 135 may include fewer components, different components, differently arranged components, or additional components than depicted in FIG. 3. Additionally, or alternatively, one or more components of MEC cluster 135 may perform functions described as being performed by one or more other components of MEC cluster 135.

Figure 4:
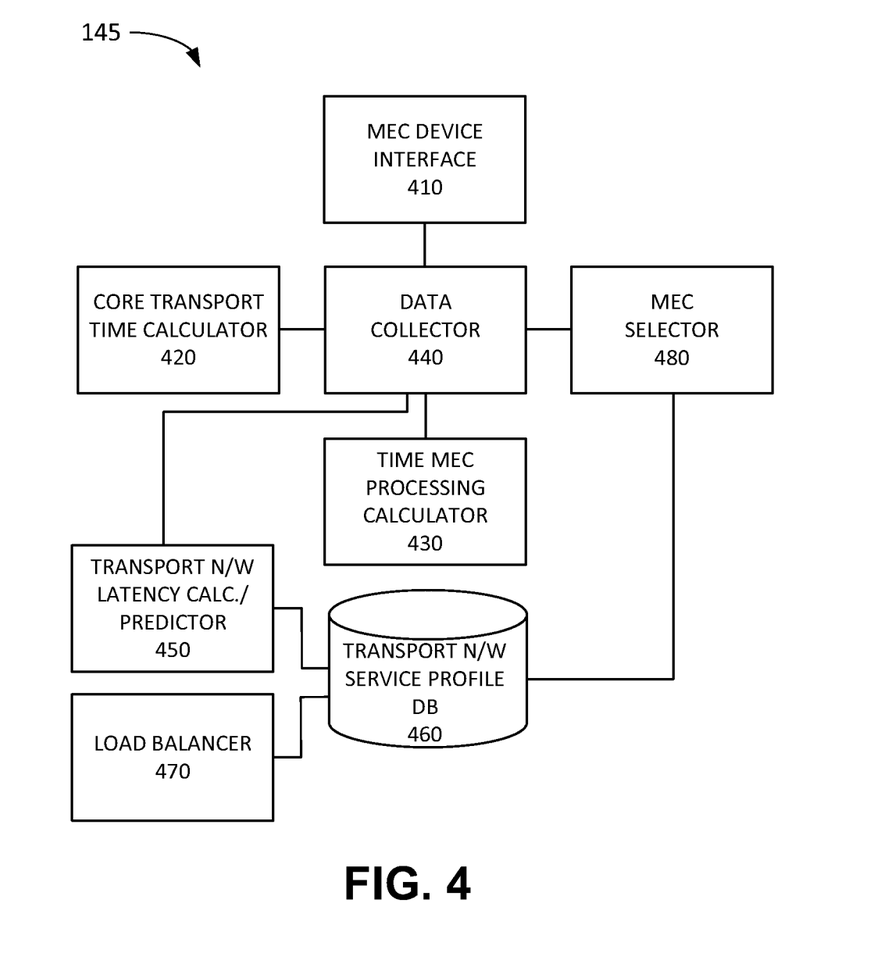
FIG. 4 illustrates exemplary components of the orchestration system of FIG. 1 according to an implementation described herein.

FIG. 4 is a diagram illustrating exemplary components of orchestration system 145. The components of orchestration system 145 may be implemented, for example, via processor 220 executing instructions from memory 230. Alternatively, some or all of the components of orchestration system 145 may be implemented via hard-wired circuitry. As shown in FIG. 4, orchestration system 145 may include a MEC device interface 410, a core transport time calculator 420, a time MEC processing calculator 430, a data collector 440, a transport network latency profile DB 410, a transport network latency calculator/predictor 450, a load balancer 470, and a MEC selector 480.

MEC device interface 410 may be configured to communicate with MEC cluster 135. For example, MEC device interface 410 may send instructions to MEC cluster 135 and may, in response, receive service parameter data from MEC cluster 135. Core transport time calculator 420 may calculate a time associated with data transport over each core network 140 associated with MEC cluster 135. For example, core transport time calculator 420 may determine a time to traverse a type of network node, e.g., a switch, a router, a firewall, etc., multiplied by the number of nodes, plus the time for traversing a length of the fiber. Any number of core network paths may be available for MEC cluster 135 and/or a particular application service, and each core network path may have its own latency based on fiber technology, number of hops, distance from cluster 135 through core network 140, etc.

Time MEC processing calculator 430 may calculate a time associated with MEC processing associated with each MEC cluster 135. For example, determining a time based on processing hardware capability, such as CPU, GPU, storage disk and memory, hardware accelerator device, virtual device, type of operating system, complexity of the application service, volume demand, volume demand (e.g., number of users). etc.

Data collector 440 may collect transport network times from MEC clusters 135 and send the data to transport network latency calculator/predictor 450. Transport network latency calculator/predictor 450 may calculate a transport network latency based on the collected transport network times and generate a transport network latency profile to be stored in transport network service profile DB 460. Exemplary information that may be stored in transport network service profile DB 460 is described below with reference to FIG. 5.

Load balancer 470 may be configured to determine when to initiate smart load balancing based on the selection of MEC cluster 135 made by MEC selector 480. For example, load balancer 470 may determine any impact that selection of a particular transport network is likely to have on MEC network 130, for example, based on dynamic latency parameters such as the volume demand associated with the time for MEC processing, the route length associated with the time for traversing core network 140, etc. Based on the determination, load balancer 470 may initiate a transfer of load from one or more MEC clusters to one or more other MEC clusters. In some implementations, load balancing may be determined to be needed, as an initial matter, to make the MEC cluster selection.

MEC selector 480 may select a particular MEC cluster 135 for an application session requested by UE device 110. For example, a session request, from UE device 110 requesting a MEC service) may be associated with a particular latency requirement, a particular throughput requirement, a particular capability requirement (e.g., an AI accelerator, a GPU capable of a particular number of parallel processes, a particular application, etc.), and/or another type of service requirement. MEC selector 480 may access transport network service profile DB 460 and select MEC cluster 135 that satisfies the MEC request requirements initially and for the duration of the application session. In one implementation, MEC selector may select core network 140 based on the selection of MEC cluster 135.

Although FIG. 4 shows exemplary components of orchestration system 145, in other implementations, orchestration system 145 may include fewer components, different components, differently arranged components, or additional components than depicted in FIG. 4. Additionally, or alternatively, a component of orchestration system 145 may perform functions described as being performed by another component of orchestration system 145.

Figure 5:
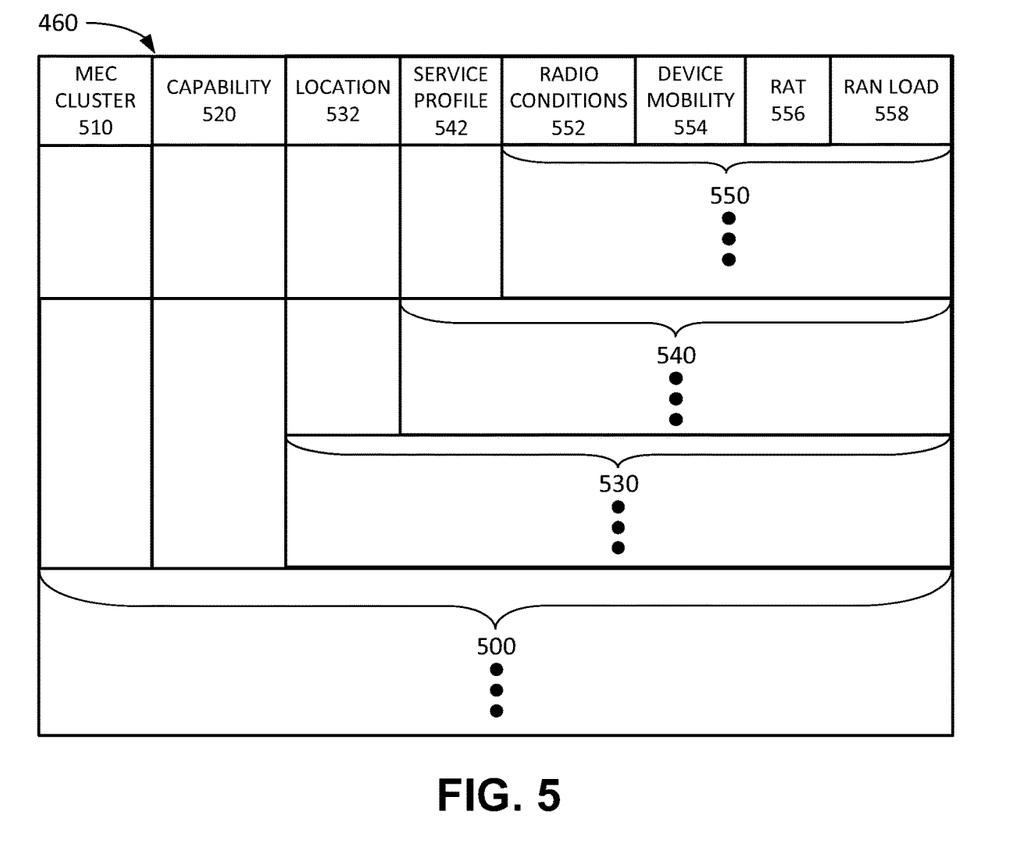
FIG. 5 illustrates exemplary components of transport network service profile database of FIG. 4 according to an implementation described herein.

FIG. 5 is a diagram illustrating exemplary information stored in transport network service profile DB 460 according to an implementation described herein. As shown in FIG. 5, transport network service profile DB 460 may include one or more MEC cluster records 500. Each MEC device record 500 may store information relating to each MEC cluster 135. MEC records 500 may be updated by orchestration system 145 at particular intervals and/or based on a trigger event. MEC device record 500 may include a MEC cluster field 510, a capability field 520, and one or more location records 530.

MEC cluster field 510 may store information particularly identifying MEC cluster 135. For example, MEC cluster field 510 may store a name of MEC cluster 135, an TP address, a Media Access Control (MAC) address, and/or another type of identifier associated with MEC cluster 135. Capability field 520 may store information relating to the particular capabilities of MEC cluster 135, such as, for example, whether MEC cluster 135 includes a particular type of CPU, GPU, TPU, hardware accelerator device, virtual device, operating system, application, and/or other types of capability information. Furthermore, the capability information may include capacity information for available network bandwidth, number of connections/sessions available for UE devices 110, processors, memory devices, virtual devices, applications, and/or other types of capacity information.

Location record 530 may store information associated with a particular service location. Location record 530 may include a location field 532 and one or more service profile records 540. Location field 532 may identify a particular location in the service area of wireless station 125 associated with MEC cluster 135. As an example, location field 532 may store global positioning system (GPS) coordinates and/or a physical address for the particular location. As another example, location field 532 may identify a particular area (e.g., LRE 122) in the service area of wireless station 125.

Service profile record 540 may store information associated with a calculated time (e.g., latency) for a transport network. Service profile record 540 may include a service profile field 542 and one or more RTT record 550. Service profile field 542 may include particular values, for example, RTTs, and/or another observed, calculated, or predicted transport network time for a MEC device record 500.

RTT record 550 may store information relating to latencies measured for different application sessions, such as an OWD value, an RTT value, a bandwidth-delay product value, a packet delay variation value, and/or another type of latency value. RTT record 550 may include a radio conditions field 552, a device mobility field 554, a RAT field 556, and a RAN load field 558. Radio conditions field 552 may store RTTs associated with signal quality values measured for UE device 110 in particular LREs 122, such as, e.g., a wireless signal quality value, a jitter value, an error rate value, and/or another type of signal quality value. Device mobility field 554 may store RTTs associated with mobility parameters (e.g., speed and/or travel direction, etc.) for UE device 110 for the application session. RAT field 556 may store RTTs associated with particular RATs (e.g., 5G, 4G, etc.) associated with RAN 120. RAN load field 558 may store RTTs associated with parameters identified for RAN 120, such as number of users, allocated block resources, throughput from UE device 110 to MEC cluster 135, etc.

Although FIG. 5 shows exemplary components of transport network service profile DB 460, in other implementations, transport network service profile DB 460 may include fewer components, different components, additional components, or differently arranged components than depicted in FIG. 5.

Figure 6:
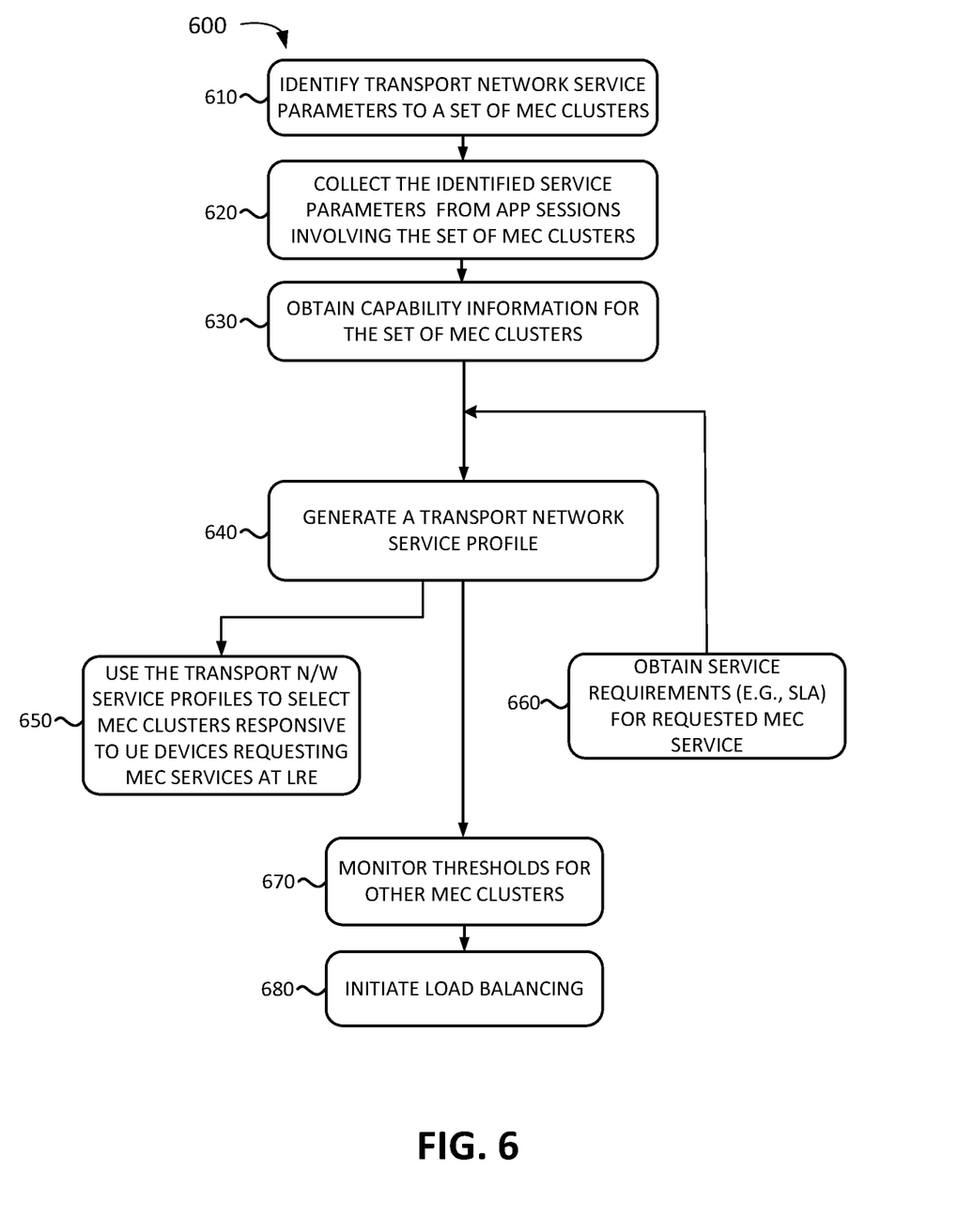
FIG. 6 illustrates a flowchart of a process for selecting a MEC cluster according to an implementation described herein.

FIG. 6 illustrates a flowchart of a process 600 for MEC cluster selection from available MEC clusters for MEC service instantiation according to an implementation described herein. In some implementations, the process of FIG. 6 may be performed by orchestration system 145. In other implementations, some or all of the process of FIG. 6 may be performed by another device or a group of devices separate from orchestration system 145.

Process 600 may include identifying a set of transport network parameters to a set of MEC clusters (block 610) and collecting the identified parameters from application sessions serviced by a set of MEC clusters (block 620). Some of the identified parameters may relate to UE device 110, individual LREs 122, the requested MEC service, and/or the transport networks providing the requested MEC service. Orchestration system 145 may send instructions to the set of MEC clusters 135 in a set of MEC networks 130, such as, for example, based on a set of MEC services accessible via a set of locations within the service range of wireless stations 125. MEC cluster 135 may determine service parameters for the collected application session packets, such as a latency value, a throughput value, a signal quality value, and/or another type of value. MEC cluster 135 may then provide the determined parameter values to orchestration system 145.

Capability information for the set of MEC devices may be obtained (block 630). For example, orchestration system 145 may query MEC devices 135 for capability and/or capacity information and store the capability and/or capacity information in a database. A transport network service profile may be generated (block 640, for example, that relates one or more service parameters and the obtained capability information to particular MEC devices in each transport network. For example, orchestration system 145 may generate a latency profile associated with each transport network and/or transport network segment for accessing the MEC service.

In one implementation, orchestration system 145 may calculate round trip times (RTTs) between UE device 110, wireless station 125, MEC clusters 135, and/or core network 140. Different RTTs may be calculated for a single LRE 122, for example, an exterior RTT, an interior RTT, and/or an RTT for different altitudes, for example, corresponding to different levels of a multi-level building. The transport network service profile may include an RTT associated with a local radio conditions parameter for LRE 122 from which the request is made, an RTT associated with the RAT of RAN 120, an RTT associated with a current load parameter for RAN 120, and/or an RTT associated with a mobility parameter of the UE device within LRE 122. An overall RTT may be calculated from a sum of the RTTs with or without an applied weighting of one or more of the RTTs.

In response to a request from UE device 110 for a MEC service, orchestration system 145 may use transport network service profiles of potential transport network routes to select a MEC cluster to provide the MEC service (block 650). Based on the request, orchestration system 145 may determine the service requirements (e.g., SLAs) associated with the requested MEC service, such as, for example, a latency requirement, a throughput requirement, a capability requirement, and/or another type of service requirement (block 660). Orchestration system 145 may access transport network service profile DB 460 and select a MEC cluster 135 that is best suited to satisfy the MEC request requirements initially and/or for the duration of the application session.

Thresholds of various service parameters may be monitored for each of MEC clusters 135 (block 670) and a load balancing operation may be triggered (block 680), for example, if a threshold for one or more of the service parameters are predicted to be and/or are reached/exceeded. For example, MEC cluster 135 and/or orchestration system 145 may predict that packets associated with MEC cluster 135 are likely to reach or exceed a latency requirement, a throughput requirement, a signal quality requirement, and/or another type of requirement. As another example, MEC cluster 135 and/or orchestration system 145 may predict that a bandwidth capacity threshold, a storage capacity threshold, a processor load capacity, and/or another type of capacity threshold is likely to be reached. For example, orchestration system 145 may determine that instantiation of the MEC service at the selected MEC cluster 135 may cause an overload state in MEC network 130 which may be counteracted with targeted load balancing operations. In other implementations, predicted dynamic loading threshold levels may be based on established network traffic patterns corresponding to one or more applicable factors, such as the relevant time of day (e.g., commuting patterns, etc.), day of the week (e.g., weekday vs week-end, etc.), time of the year (e.g., seasonal and/or weather-related usage, etc.), location-based events (e.g., capacity-specific venues, etc.), official holidays (e.g., vacation/travel destinations, etc.), cultural events (e.g., spectator sporting events, live concerts, etc.), school schedules (e.g., college student influx/break periods, etc.), and/or any other periodic or predictable transient traffic loading.

Figure 7:
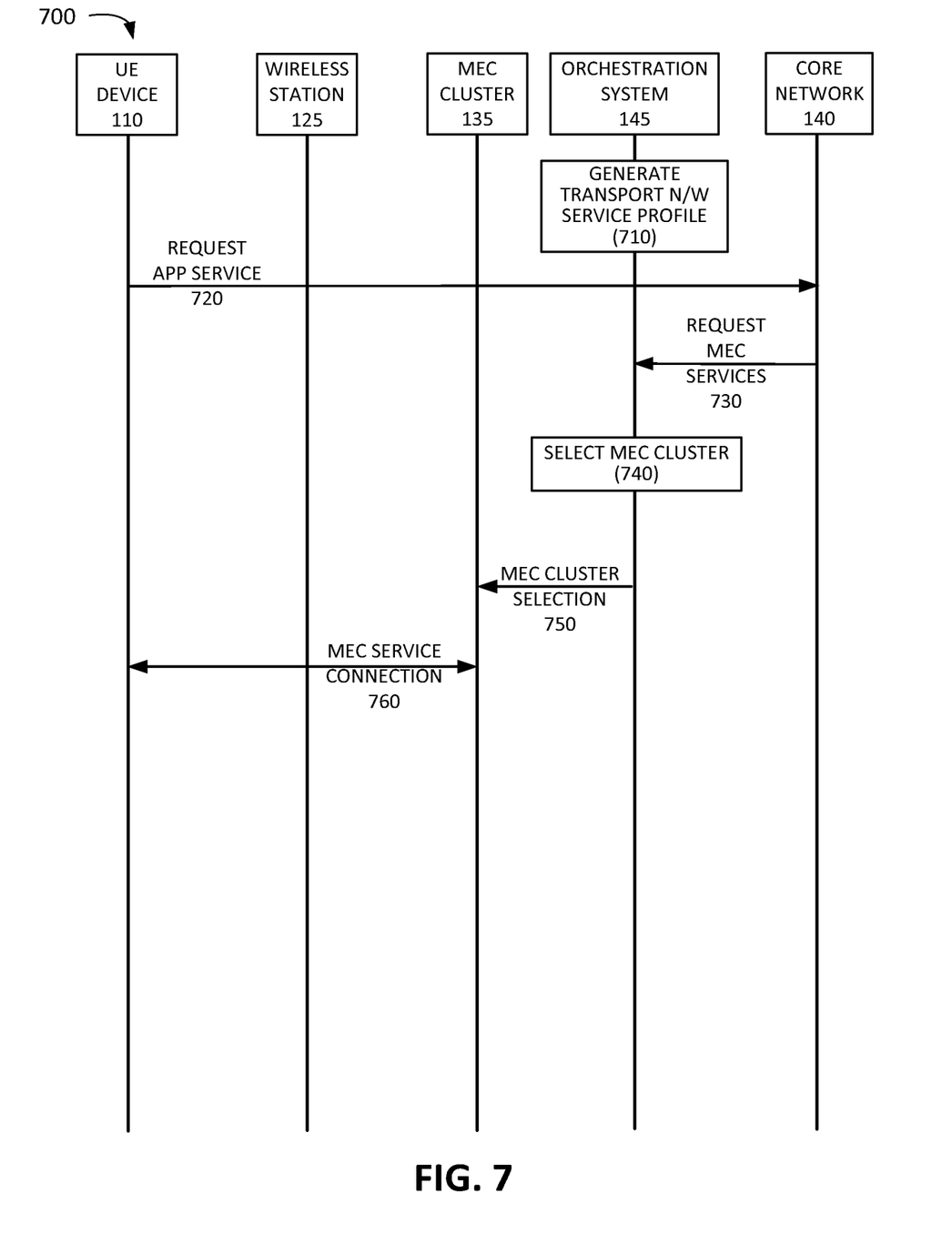
FIG. 7 illustrates exemplary messaging and operations according to an implementation described herein.

FIG. 7 illustrates an exemplary signal flow 700 according to an implementation described herein, in which orchestration system 145 may generate a transport network service profile (block 710) from service parameter data collected from application sessions over MEC network 130. Subsequently, UE device 110 may request an application service via wireless station 125 that is forwarded to core network 140 (signal 720). Core network 140 determines that the requested application service has a latency requirement that cannot be ensured by application service instances located in core network or packet data network 150, and accordingly sends a request for MEC services to orchestration system 145 (signal 730).

In response, orchestration system 145 may determine which MEC clusters 135 provide the requested application service. Orchestration system 145 may then determine which data transport networks include the identified MEC clusters 135. Using the transport network service profiles, orchestration system 145 may determine which of the transport network service profiles have associated service parameters (e.g., latency) that will satisfy the service parameter (e.g., latency) requirements for the requested application service identified in the service request. Among the potential transport networks (i.e., routes), orchestration system 145 may select the one having the lowest associated latency, for example (block 740). Alternatively, orchestration system 145 may select a transportation network that does not have the lowest latency and/or lowest RTT, based on other considerations (e.g., impact on other portions of MEC network 130, etc.). For example, the requested application service may have some aspects (e.g., billing, etc.) that are to be provided from core network 140 instead of MEC cluster 135, and thus the transport network may include the data transport time over various paths of core network 140. The selection of a core network path may or may not impact the selection of MEC cluster 135.

Orchestration system 145 may inform MEC cluster 135 of its selection (signal 750), and a MEC service connection may be established between UE device 110 and the MEC instance at MEC cluster 135 (signal 760), and maintained for the duration of the application session and/or until handover is necessary due to movement of UE 110 between LREs 122.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks and a series of signals operations have been described with respect to FIGS. 6 and 7, respectively, the order of the operations and/or signals may be modified in other implementations. Further, non-dependent operations and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions.

A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   collecting service parameters associated with application sessions associated with a plurality of multi-access edge computing (MEC) clusters;
   obtaining, capability information associated with each of the plurality of MEC clusters;
   generating service profiles for a set of transport networks based on the service parameters and the capability information, wherein each of the transport networks includes at least one of the plurality of MEC clusters;
   receiving, from a user equipment (UE) device, a request for a MEC service having a minimum service requirement; and
   selecting, based on the service profiles, a MEC cluster from the plurality of MEC clusters to provide the MEC service, wherein the selected MEC cluster is included in a first transport network that meets the minimum service requirement.

2. The method of claim 1, wherein the first transport network further includes a wireless access station, and wherein the service profile includes a latency value that is determined based on a round trip time for data transmitted from the UE device to the wireless access station and on a processing time associated with the selected MEC that is determined based on the capability information.

3. The method of claim 2, wherein the first transport network further includes a first core network path, and wherein the latency value is further based on a first data transport time associated with the first core network path which is identified in the service profile for the first core network path.

4. The method of claim 3, further comprising:
   selecting the first core network path from a plurality of core network paths associated with the plurality of MEC clusters, wherein the first data transport time is not less than at least a second data transport time associated with a second core network path of the plurality of core network paths.

5. The method of claim 1, wherein the minimum service requirement comprises a maximum latency value, and wherein the service profile includes at least one of:
   a first round trip time (RTT) associated with a local radio conditions parameter for a local radio environment (LRE) from which the request is made,
   a second RTT associated with a radio access technology (RAT) parameter for a connection of the UE device to the selected MEC cluster,
   a third RTT associated with a current load parameter for a wireless access network via which the UE device connects to the selected MEC cluster,
   a fourth RTT associated with a mobility parameter of the UE device, or
   a fifth RTT associated with a current processing load parameter for the selected MEC cluster.

6. The method of claim 5, wherein the request includes the local radio conditions parameter, and wherein the local radio conditions parameter comprises at least one of a signal strength or a signal interference.

7. The method of claim 5, wherein the request includes the RAT parameter, and wherein the RAT comprises a Fifth Generation (5G) wireless technology.

8. The method of claim 5, wherein the request includes the current load parameter, and wherein the current load parameter comprises at least one of available throughput, number of users, or allocated block resources.

9. The method of claim 5, wherein the request includes the mobility parameter, wherein the mobility parameter comprises a speed of the UE device within the LRE, and wherein the service profile includes an RTT value that is based on a sum of the first RTT, the second RTT, the third RTT, and the fourth RTT.

10. The method of claim 5, wherein the request includes the current processing load parameter, and wherein the current processing load parameter is based on a processing capacity of the selected MEC cluster.

11. The method of claim 1, further comprising:
    determining, based on the selected MEC cluster providing the MEC service, that a threshold for one or more of the service parameters is projected to be reached for one or more of the plurality of MEC clusters; and
    initiating, in response to the determining, a load balancing operation for the one or more of the plurality of MEC clusters.

12. A device comprising:
    a processor configured to:

collect service parameters associated with application sessions associated with a plurality of multi-access edge computing (MEC) clusters;

obtain capability information associated with each of the plurality of MEC clusters;

generate service profiles for a set of transport networks based on the service parameters and the capability information, wherein each of the transport networks includes at least one of the plurality of MEC clusters;

receive, from a user equipment (UE) device, a request for a MEC service having a minimum service requirement; and select, based on the service profiles, a MEC cluster from the plurality of MEC clusters to provide the MEC service, wherein the selected MEC cluster is included in a first transport network that meets the minimum service requirement.

13. The device of claim 12, wherein the processor is further configured to:

determine, based on the selected MEC cluster providing the MEC service, that a threshold for one or more of the service parameters is projected to be reached for one or more of the plurality of MEC clusters; and initiate, in response to the determining, a load balancing operation for the one or more of the plurality of MEC clusters.

14. The device of claim 12, wherein the selected MEC cluster is not the geographically closest of the plurality of MEC clusters to the UE device.

15. The device of claim 12, wherein the minimum service requirement comprises a maximum latency value, and wherein the service profile includes at least one of:

a first round trip time (RTT) associated with a local radio conditions parameter for a local radio environment (LRE) from which the request is made, a second RTT associated with the radio access technology (RAT) parameter for a connection of the UE device to the selected MEC cluster, a third RTT associated with a current load parameter for a wireless access network via which the UE device connects to the selected MEC cluster, or a fourth RTT associated with a mobility parameter of the UE device.

16. The computer device of claim 15, wherein the request includes:

the local radio conditions parameter, and wherein the local radio conditions parameter comprises at least one of a signal strength or a signal interference, the RAT parameter, and wherein the RAT comprises a Fifth Generation (5G) wireless technology, the current load parameter, and wherein the current load parameter comprises at least one of available throughput, number of users, or allocated block resources, and the mobility parameter, wherein the mobility parameter comprises a speed of the UE device within the LRE, and wherein the service profile includes an RTT value that is based on a sum of the first RTT, the second RTT, the third RTT, and the fourth RTT.

17. A system comprising:

at least one network device configured to:

collect service parameters associated with application sessions associated with a plurality of multi-access edge computing (MEC) clusters;

obtain capability information associated with each of the plurality of MEC clusters;

generate service profiles for a set of transport networks based on the service parameters and the capability information, wherein each of the transport networks includes at least one of the plurality of MEC clusters;

receive, from a user equipment (UE) device, a request for a MEC service having a minimum service requirement; and select, based on the service profiles, a MEC cluster from the plurality of MEC clusters to provide the MEC service, wherein the selected MEC cluster is included in a first transport network that meets the minimum service requirement.

18. The system of claim 17, wherein the selected MEC cluster is not the geographically closest of the plurality of MEC clusters to the UE device.

19. The system of claim 17, wherein the minimum service requirement comprises a maximum latency value, and wherein the service profile includes at least one of:

a first round trip time (RTT) associated with a local radio conditions parameter for a local radio environment (LRE) from which the request is made, a second RTT associated with the radio access technology (RAT) parameter for a connection of the UE device to the selected MEC cluster, a third RTT associated with a current load parameter for a wireless access network via which the UE device connects to the selected MEC cluster, or a fourth RTT associated with a mobility parameter of the UE device.

20. The system of claim 19, wherein the request includes:

the local radio conditions parameter, and wherein the local radio conditions parameter comprises at least one of a signal strength or a signal interference, the RAT parameter, and wherein the RAT comprises a Fifth Generation (5G) wireless technology, the current load parameter, and wherein the current load parameter comprises at least one of available throughput, number of users, or allocated block resources, and the mobility parameter, wherein the mobility parameter comprises a speed of the UE device within the LRE, and wherein the service profile includes an RTT value that is based on a sum of the first RTT, the second RTT, the third RTT, and the fourth RTT.

* * * * *